Figure 9:
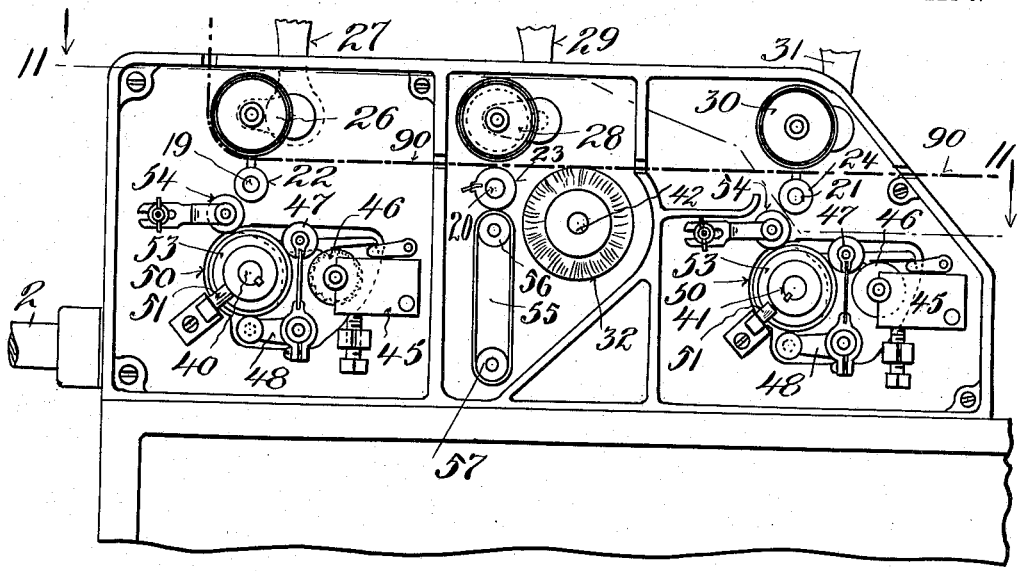

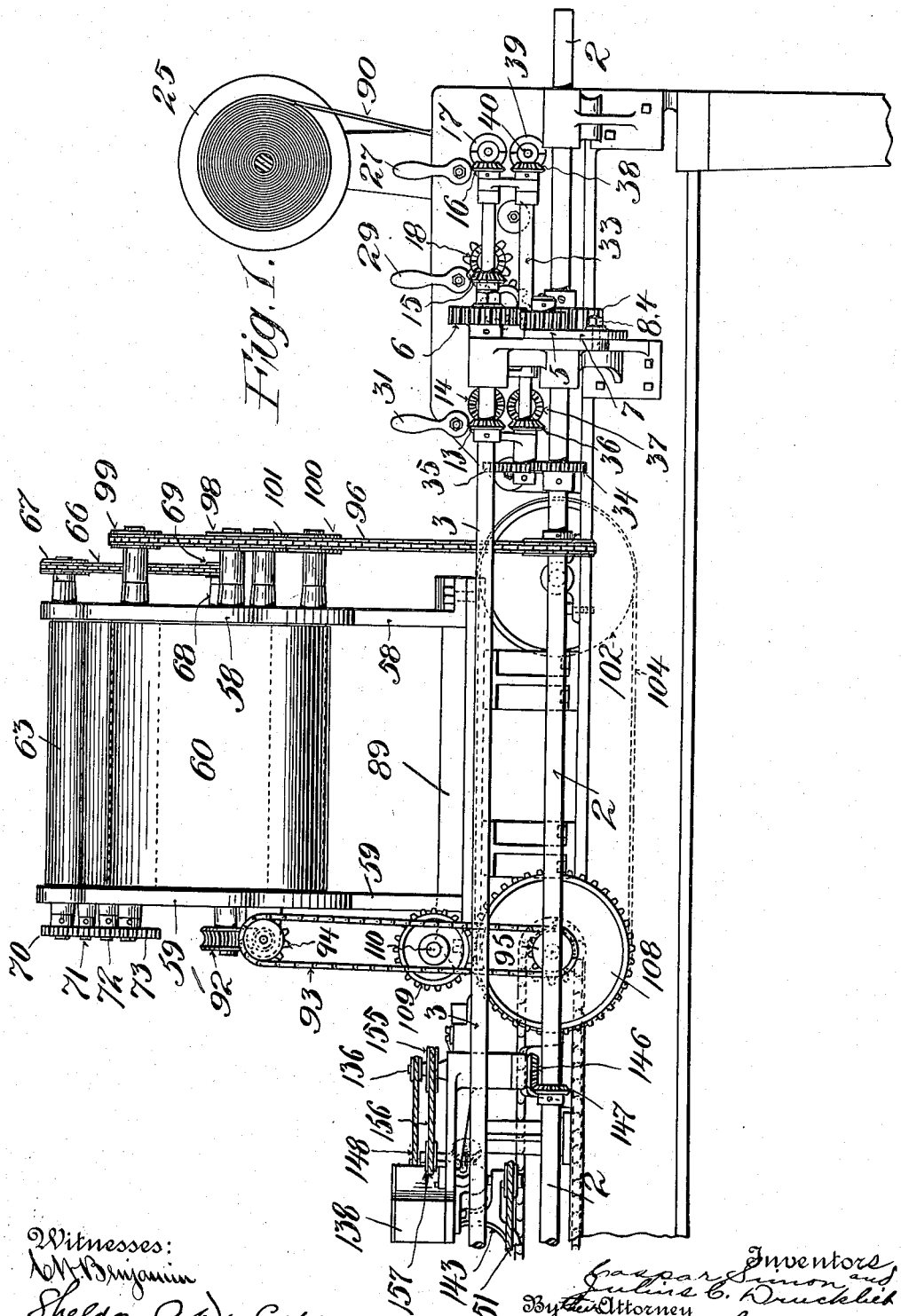

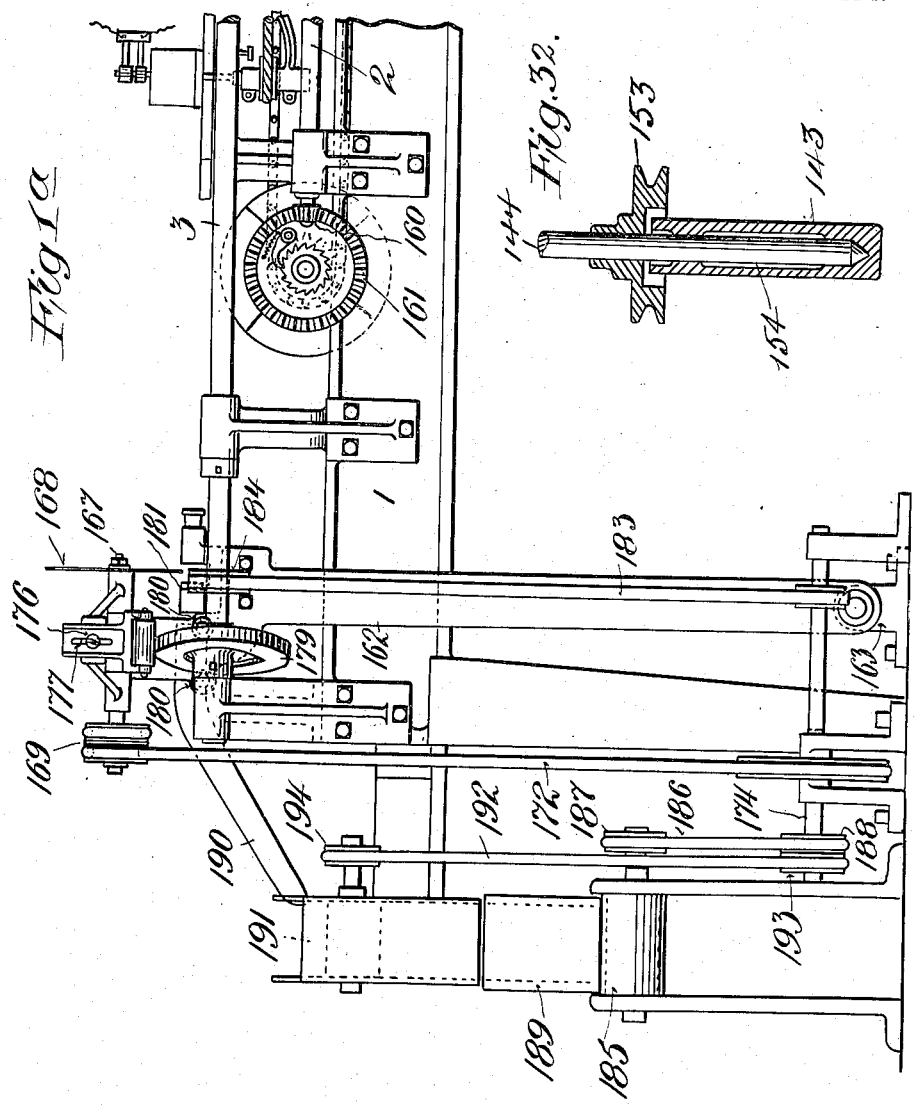

J. C. DRUCKLIEB & C. SIMON.
CIGARETTE MACHINE.
APPLICATION FILED JUNE 4, 1908.
933,239.
Patented Sept. 7, 1909.
12 SHEETS—SHEET 3.
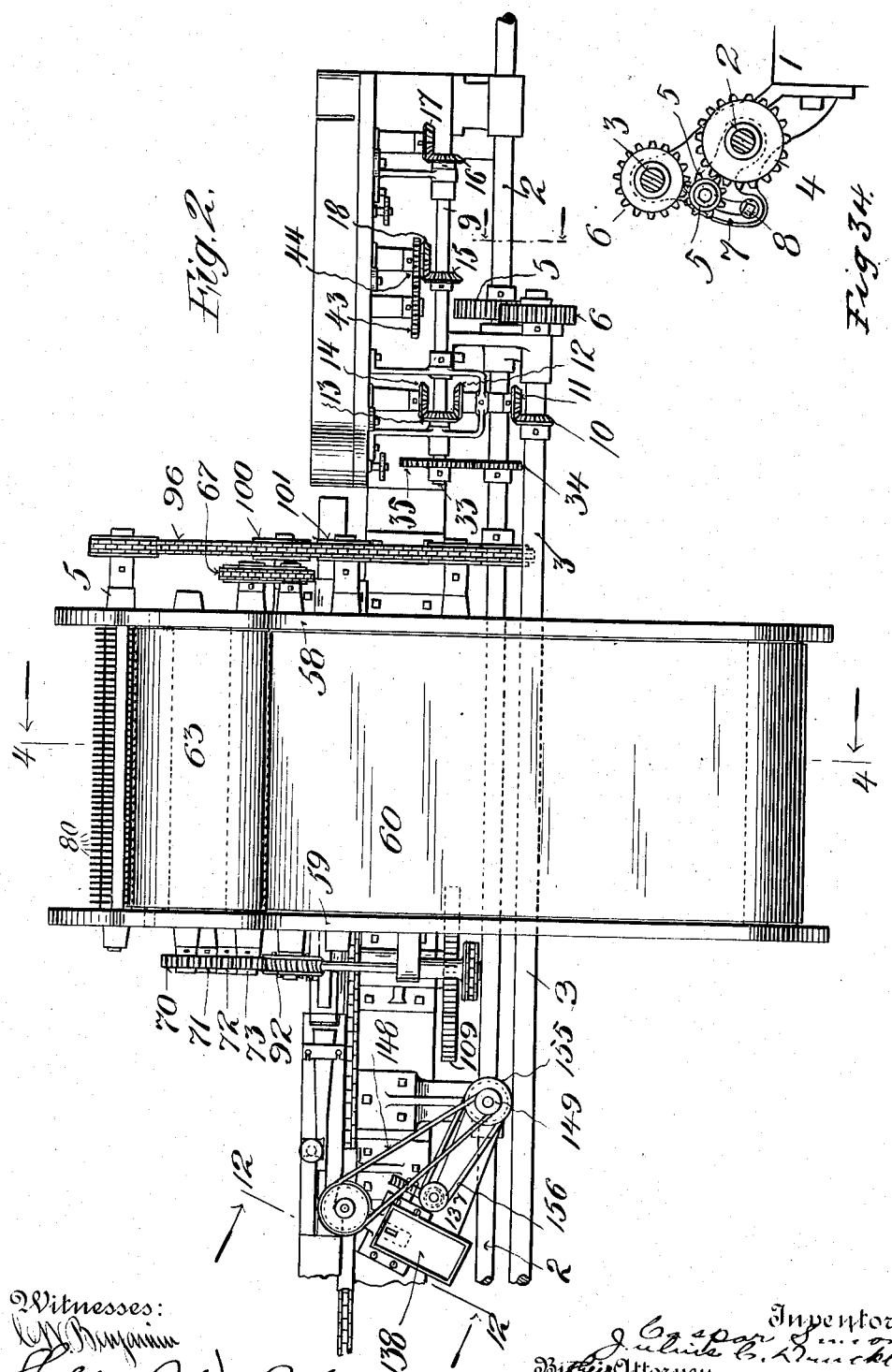

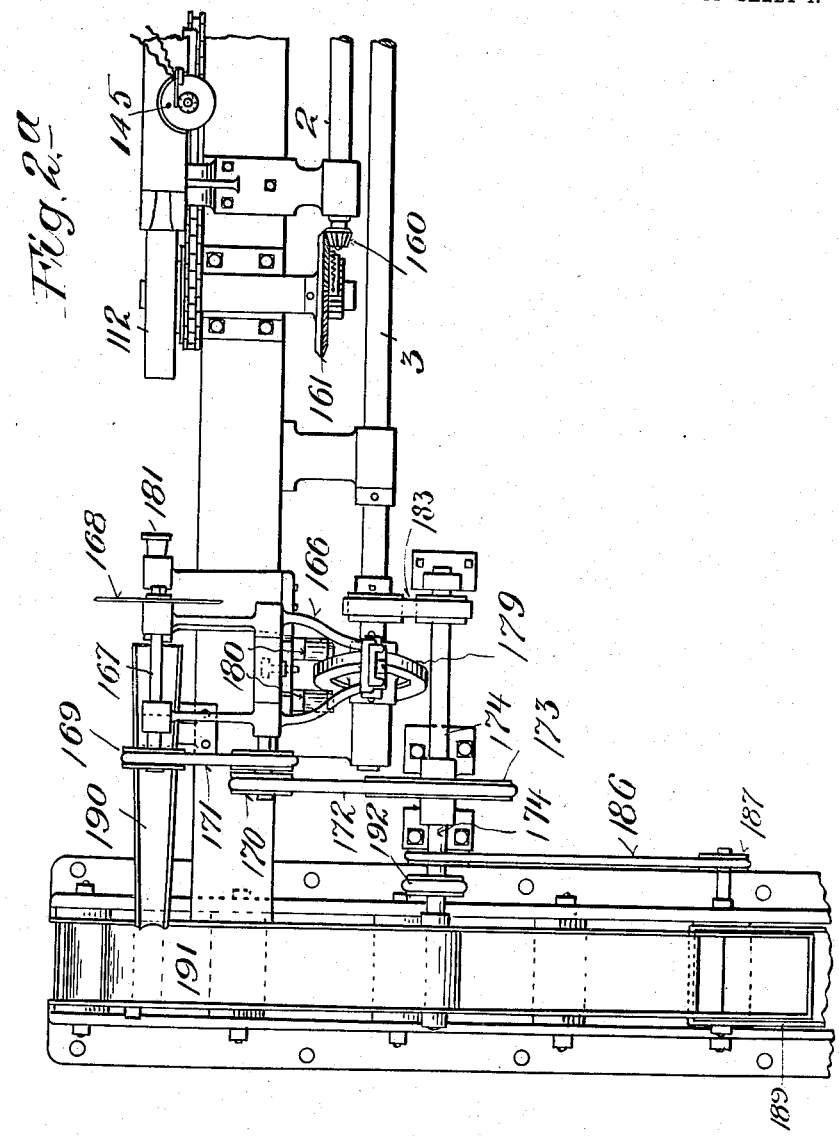

J. C. DRUCKLIEB & C. SIMON.
CIGARETTE MACHINE.
APPLICATION FILED JUNE 4, 1908.
933,239.
Patented Sept. 7, 1909.
12 SHEETS—SHEET 5.
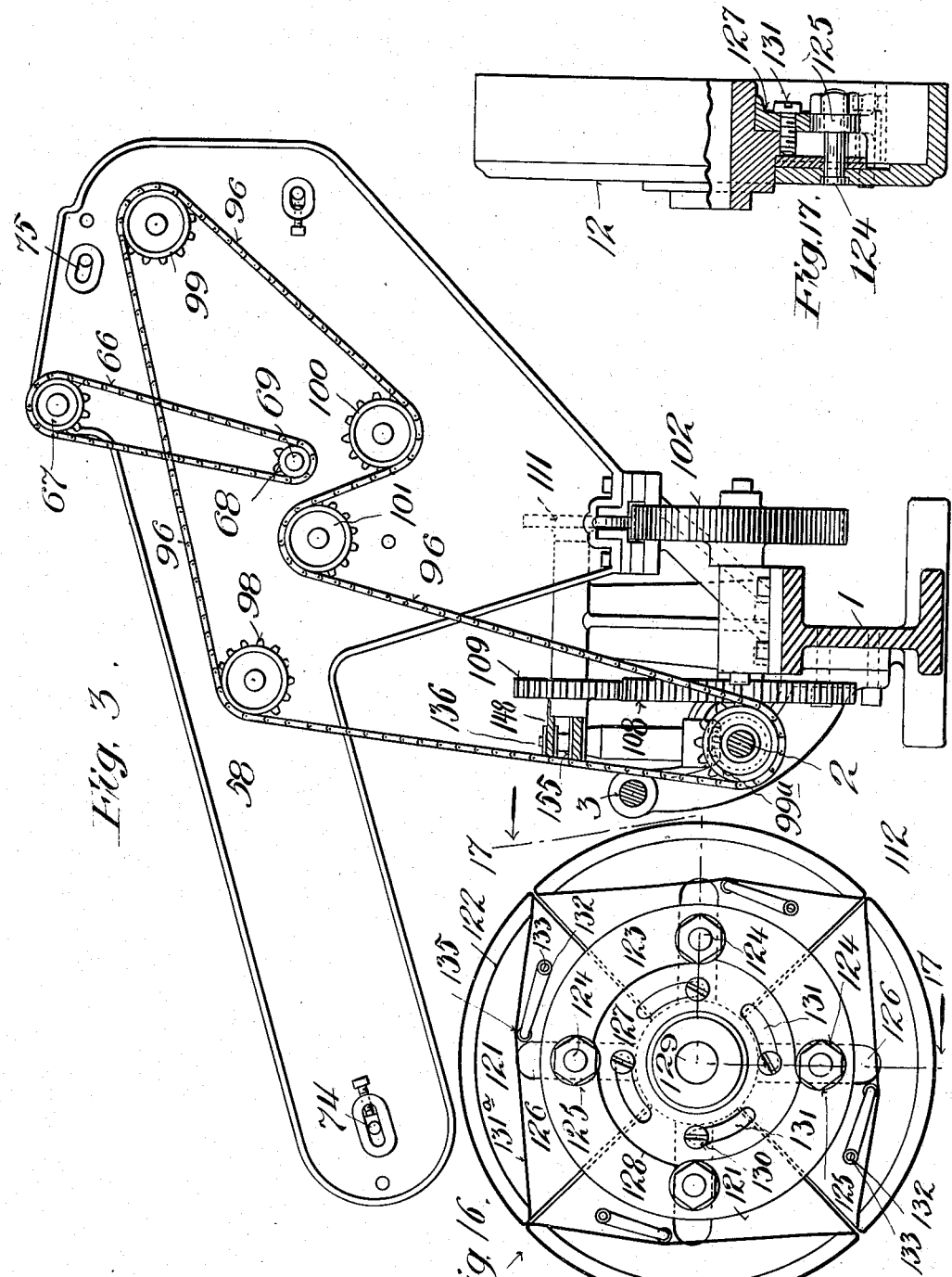

J. C. DRUCKLIEB & C. SIMON.
CIGARETTE MACHINE.
APPLICATION FILED JUNE 4, 1908.

933,239.

Patented Sept. 7, 1909.
12 SHEETS—SHEET 6.

Witnesses:

Inventors

J. C. DRUCKLIEB & C. SIMON.
CIGARETTE MACHINE.
APPLICATION FILED JUNE 4, 1908.
933,239.
Patented Sept. 7, 1909.
12 SHEETS—SHEET 7.
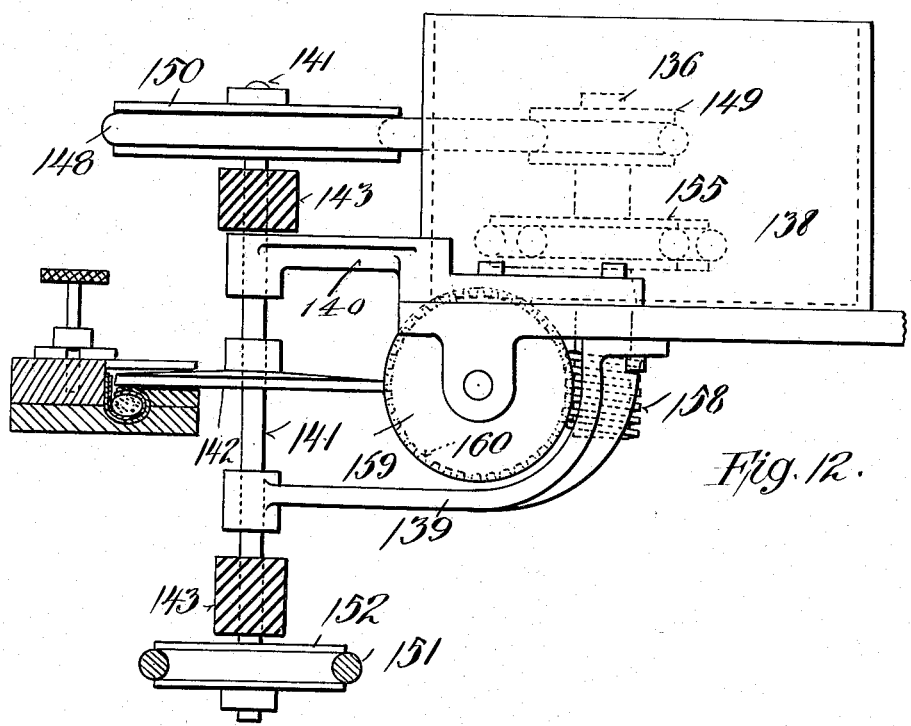
Fig. 12.
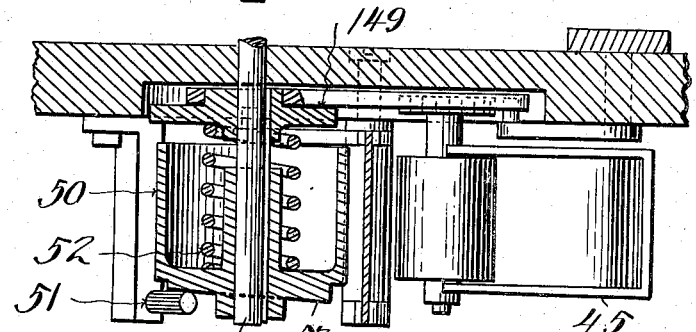
Fig. 13.
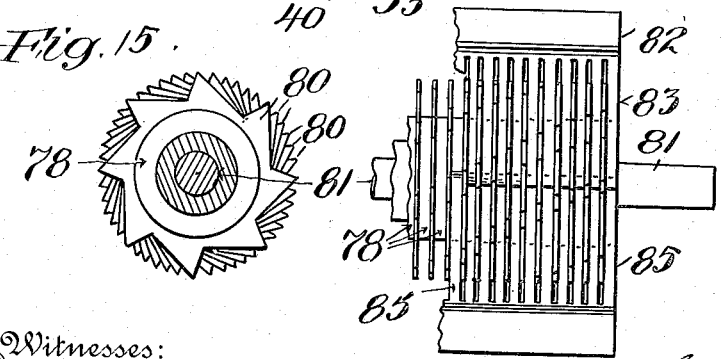
Fig. 15.
Fig. 14.
Witnesses:
Inventors
Julius C. Drucklieb
Caspar Simon
By their Attorney
Charles G. Hensley

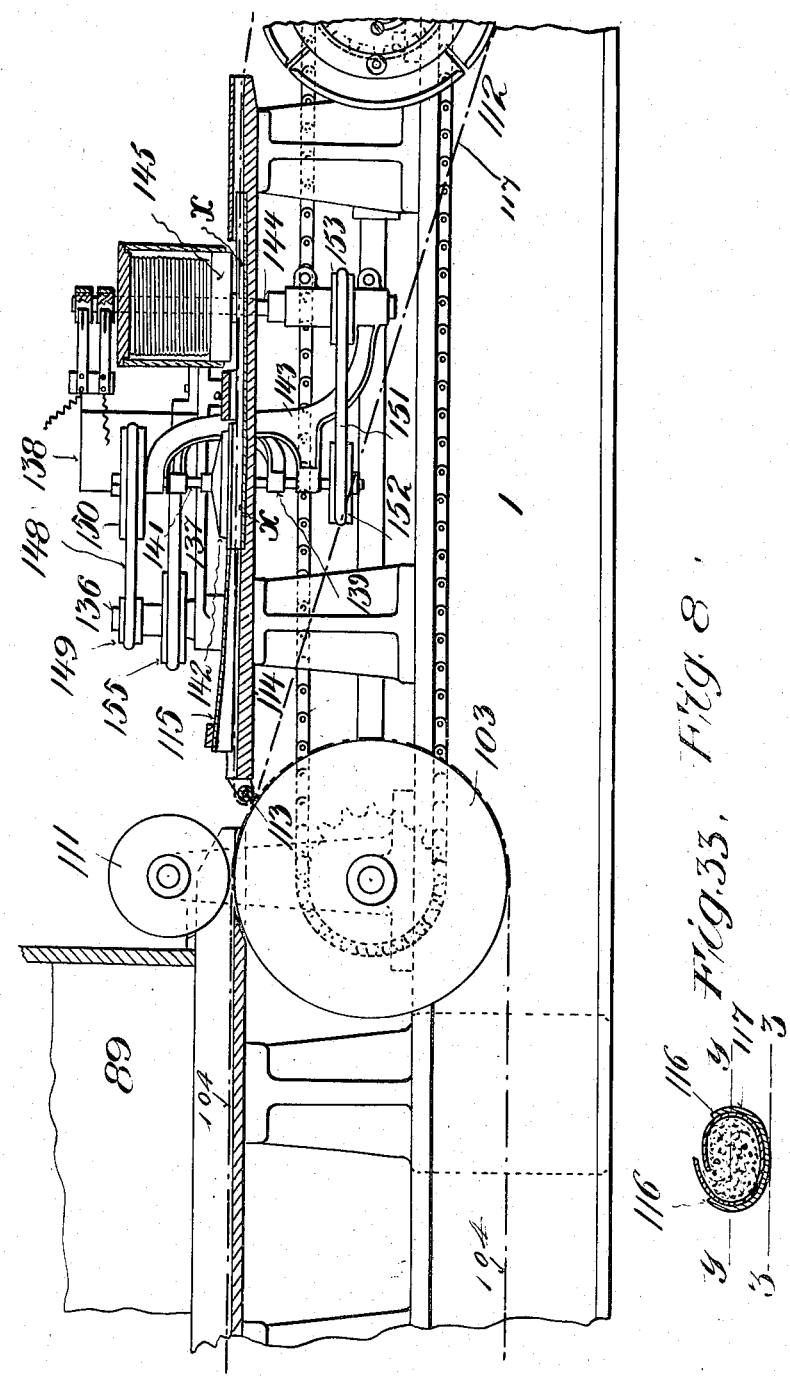

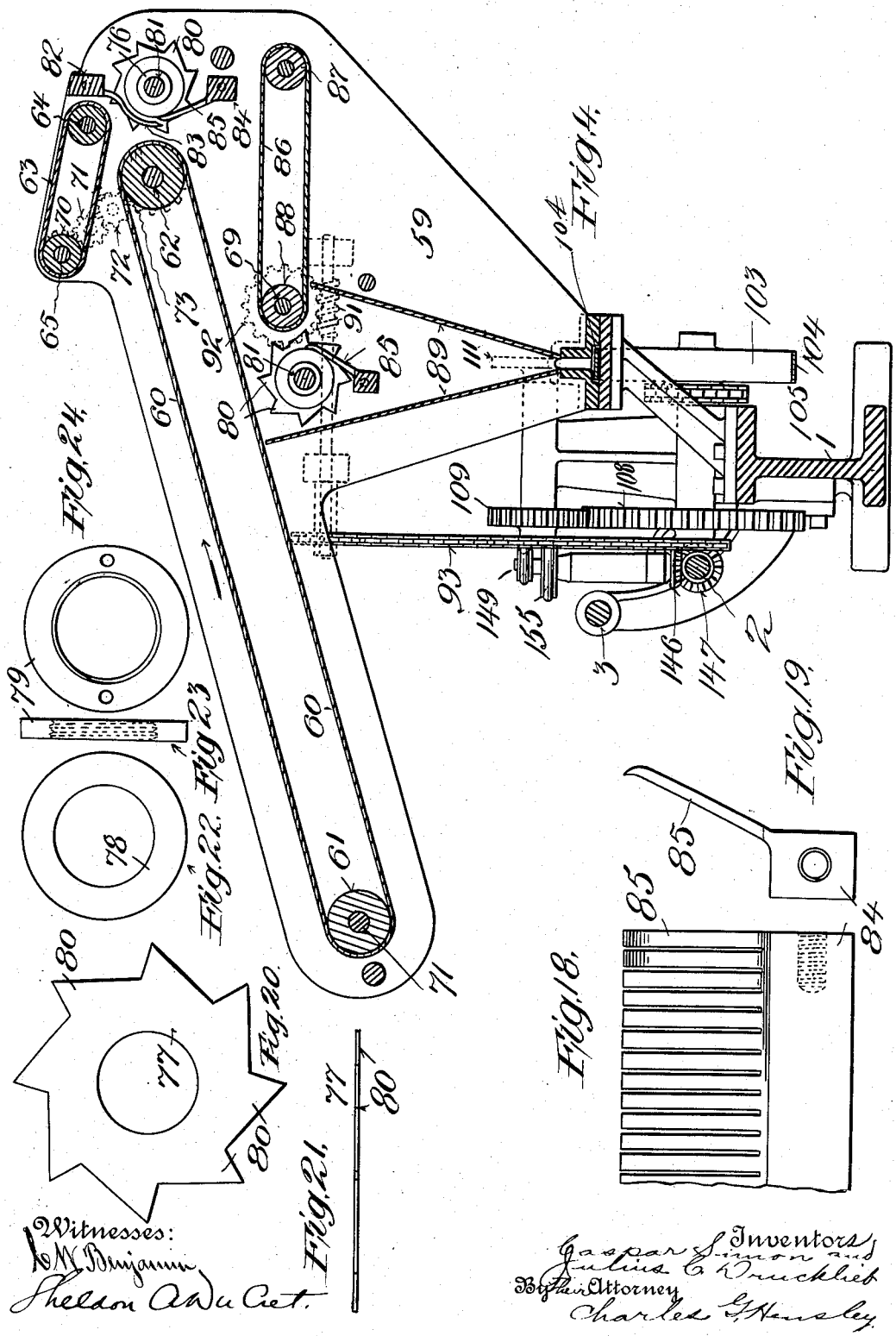

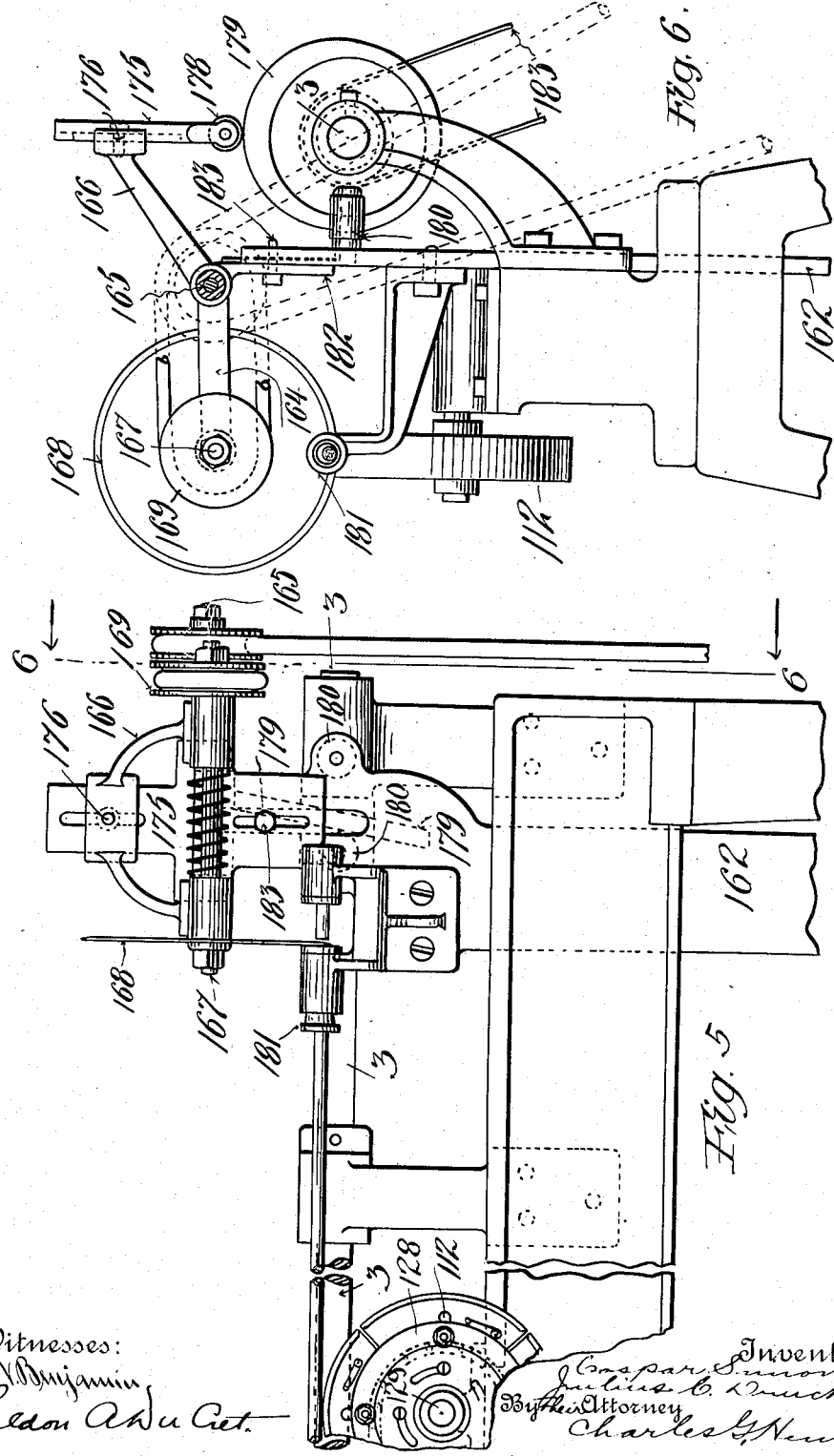

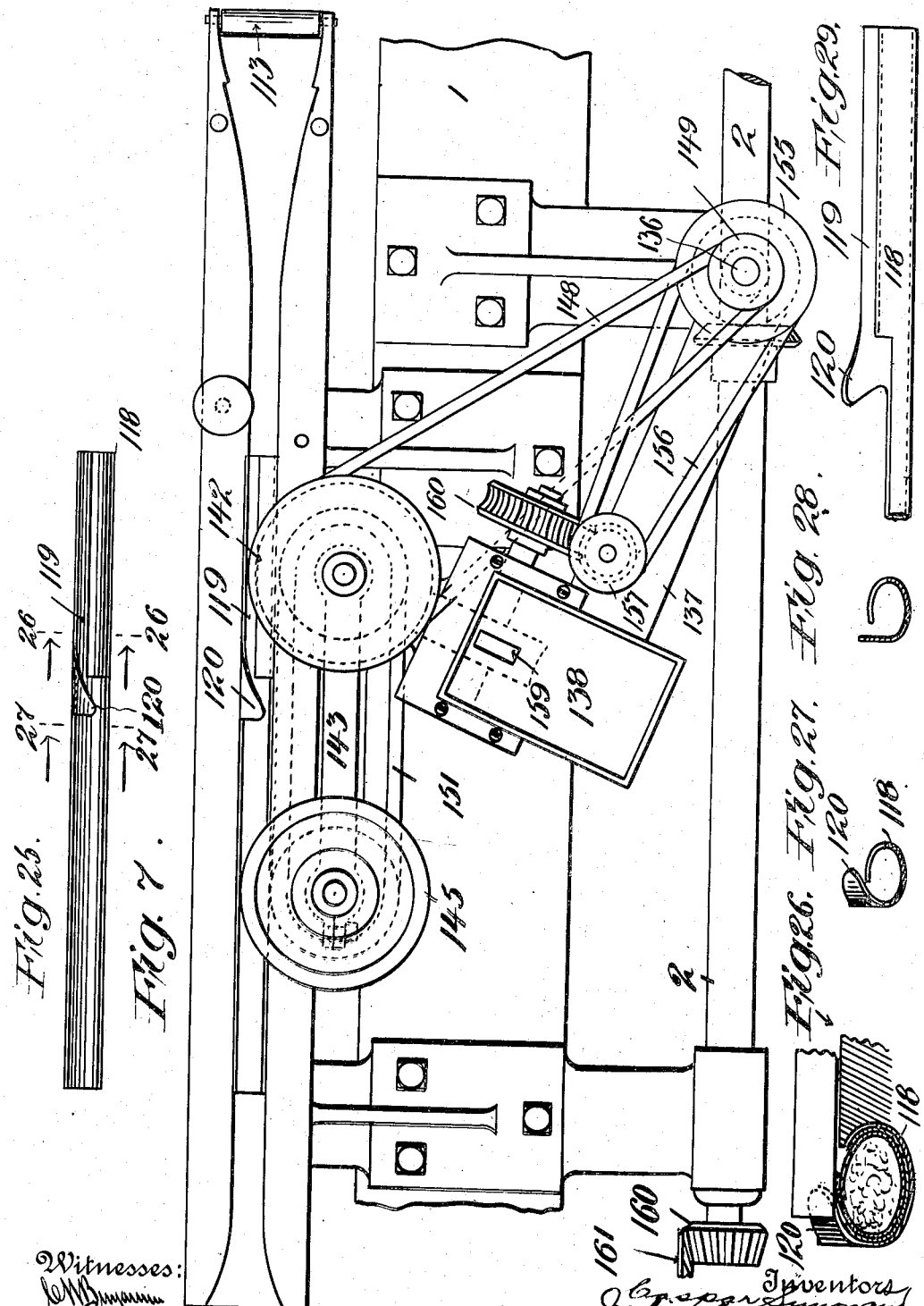

J. C. DRUCKLIEB & C. SIMON.
CIGARETTE MACHINE.
APPLICATION FILED JUNE 4, 1908.

933,239.

Patented Sept. 7, 1909.
12 SHEETS—SHEET 12.

UNITED STATES PATENT OFFICE.

JULIUS C. DRUCKLIEB, OF MONTCLAIR, AND CASPAR SIMON, OF RIDGEFIELD PARK, NEW JERSEY, ASSIGNORS, BY DIRECT AND MESNE ASSIGNMENTS, TO CHARLES A. DRUCKLIEB, OF NEW YORK, N. Y.

CIGARETTE-MACHINE.

933,239. Specification of Letters Patent. Patented Sept. 7, 1909.

Application filed June 4, 1908. Serial No. 436,564.

*To all whom it may concern:*

Be it known that we, JULIUS C. DRUCK-LIEB and CASPAR SIMON, citizens of the United States, and residents of Montclair, in the county of Essex, State of New Jersey, and of Ridgefield Park, in the county of Bergen, State of New Jersey, respectively, have invented certain new and useful Improvements in Cigarette-Machines, of which the following is a specification.

Our invention relates to improvements in machines for the manufacture of cigarettes which are formed in continuous rod and cut in suitable lengths for use.

Our object is to improve each and every one of the principal parts of a complete machine from the printing of the name, mark or other device on the cigarette paper to the placing of the finished cigarettes in a temporary receptacle.

Our object is to improve the mechanism by which the brand or other mark is placed on the paper web before it enters under the hopper, by providing a more efficient and simple, as well as economical mechanism for operating the sizing and printing dies synchronously and by which the same may be adjusted to print at different intervals, according to the length of the cigarettes which are to be made in the machine. And this alteration is made in all the printing dies by simply changing a gear, thus making the change easy and the readjustment of parts unnecessary. Furthermore this change is so made as to correspond without further adjustment, with the changes in the cigarette cutting device, so that one alteration serves for both purposes and the machine in its several parts is always in accord. There are improved details as well in the printing mechanism as will appear in the detailed description.

Another feature of improvement relates to the means for feeding the tobacco to the hopper and on the paper web. It is common to employ a traveling belt on which a predetermined quantity of tobacco (depending on the weight of the cigarettes which are being made) is placed, usually in a predetermined space on the belt so that the distribution of the tobacco on the belt will always be equal. Heretofore rollers have been provided to act in conjunction with the belt to feed the tobacco over the upper end of the belt and into the hopper and the tendency of such rollers has been to force the tobacco back on the belt and interfere with the feeding, as well as the proper distribution of the tobacco.

Our object is to provide a secondary feeding element which will so act on the tobacco on the feed belt as to properly discharge the tobacco in regular order to the picker. Our invention also includes improvements in the device by which the tobacco is picked as it leaves the feed belt and such picker-means among other things is adjustable so as to present the picker blades a greater or lesser extent beyond its grate according to the quantity of feed, which is altered to suit the requirements.

The next feature of improvement in order of operation is the former or folder in which the paper is rolled with the tobacco therein, ready for pasting and the object of this feature of our invention is to provide a former which will form the cigarette rod without any irregularity in the pressure on any particular part and which is designed to remove the stress from the paper edges and to increase the life of the tape belt which conveys the incomplete rod through the cigarette former. It is now necessary to renew such belts very often, sometimes several times a day, and our former increases the life of such belts and causes it to act more evenly upon the rod as it is forming.

Another feature of the machine is an adjustable pulley over which the tape belt which carries the rod through the former travels. By adjustment of a plurality of segments of which the pulley is formed the periphery of the pulley may be increased or decreased, to adjust the speed of the tape belt and make it accord with other propelling means of the machine. Furthermore we have provided a pasting device and a heating device both of which are swung into or out of action upon the cigarette rod on a common bracket. The heating device itself is novel in that a revolving wheel is provided which contacts on its face with the pasted seam of the cigarette rod, the wheel being heated and also rapidly revolved whereby the seam is rapidly dried while passing the heater and without in any way destroying the shape of the rod. The bearing and oil retaining device of the spindle on which the heating roller revolves is such that the bearing will always be properly oiled and the heat of the roller will not dry the oil, or cause it to run nor in any way leave the bearing of the spindle. The disposition of the heater itself is such that if oil should drop from, it would not fall on the rod.

Another object of our invention is to improve the operating elements for operating the cutting knife by which the rod is cut into lengths suitable for cigarettes. Heretofore a double sliding rack has carried the cutting knife whereas in our improved machine the knife is carried on a rocking arm which materially reduces the friction, removes the necessity for oiling parts near the cigarette rod and the power applying means for running the knife are simplified. Other features such as adjustability for allowing for wear of the knife are provided.

The next feature of our invention relates to a simple and efficient device by which the cigarettes as they leave the cutter are disposed in suitable boxes placed on a movable conveyer to be taken away from time to time.

Various other features of improvement will appear in the detailed description of one embodiment of our invention hereinafter.

Figure 10:
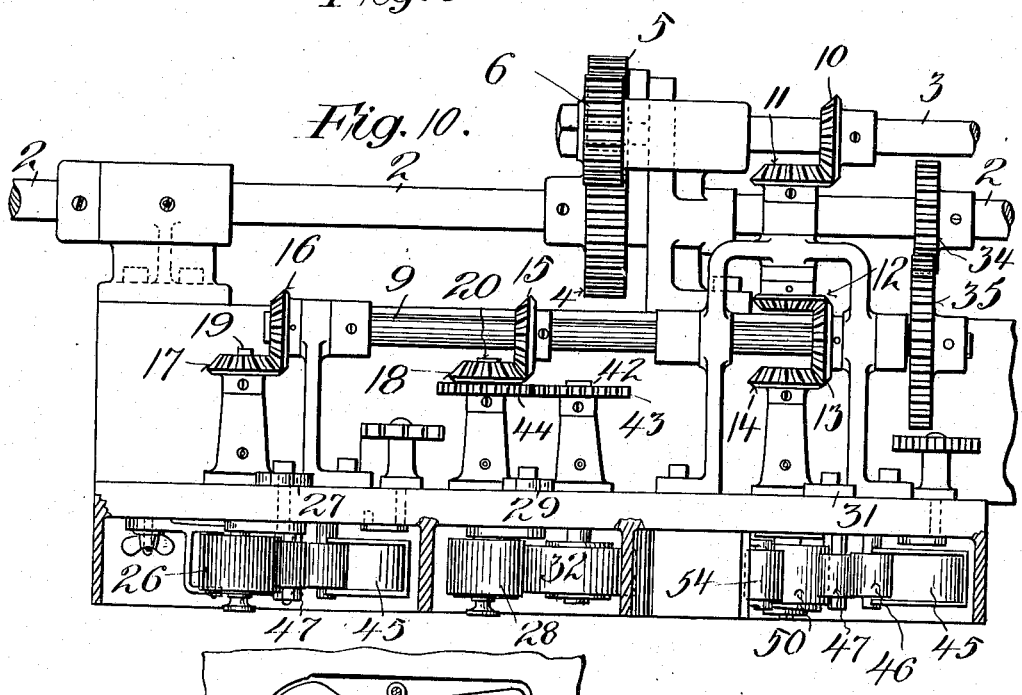
Figure 11:
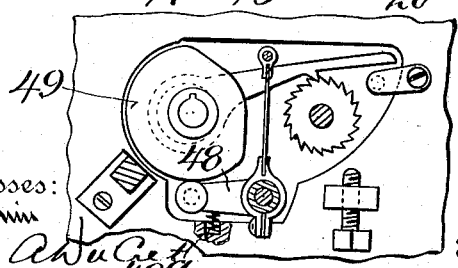
Figure 30:
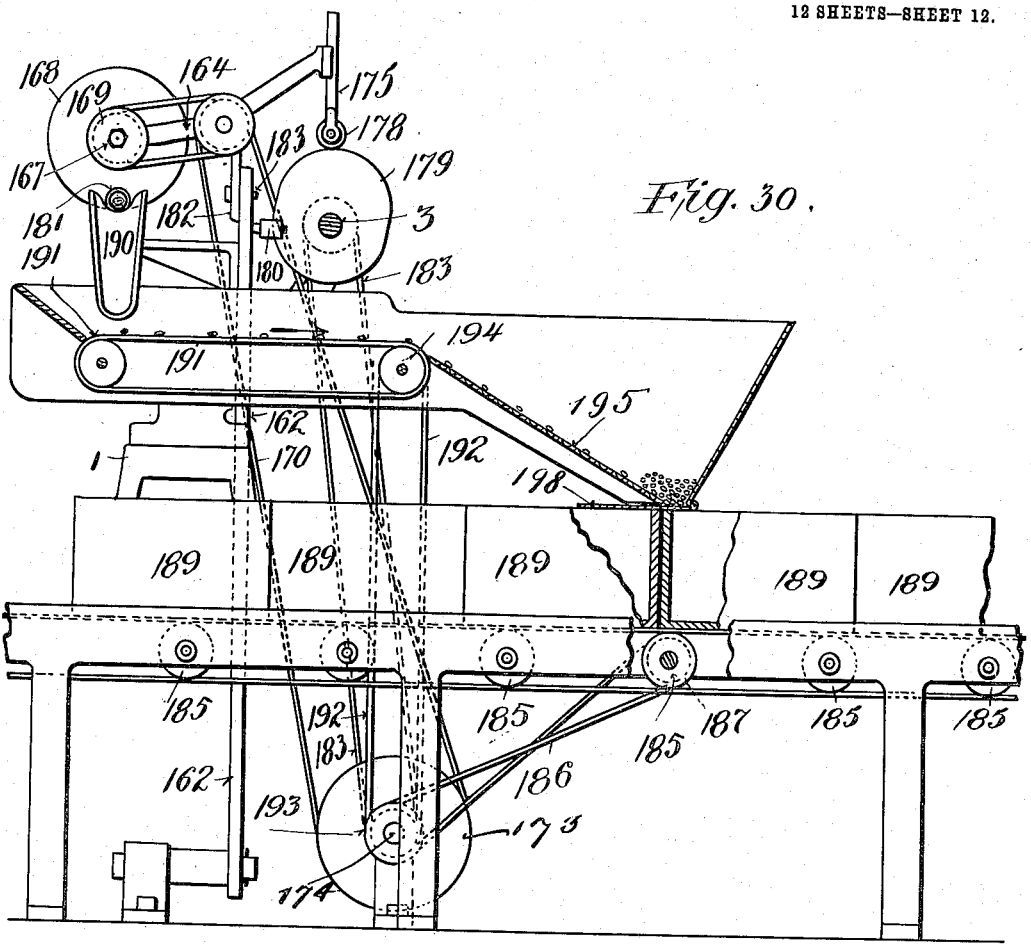
Figure 31:
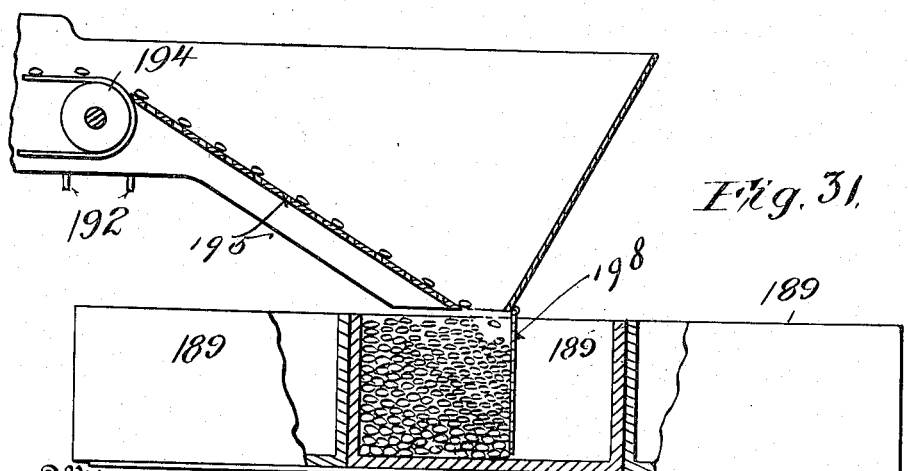

In the drawings forming a part of this application, Figure 1 and Fig. 1ª are a front elevation of our complete machine taken from the front where the operator in charge of the tobacco feed stands, Fig. 2 is a plan view of the portion of the machine shown in Fig. 1, Fig. 2ª is a plan view of that portion of the machine which is shown in Fig. 1ª, Figs. 2 and 2ª taken together constituting a plan view of the entire machine with a few parts omitted for illustrative purposes, Fig. 3 is a sectional view showing the exterior of the tobacco feeding apparatus together with its operating mechanism, Fig. 4 is a cross section through the tobacco feeding device, taken on the line 4—4 of Fig. 2, Fig. 5 is an elevation of the parts of the knife and its mechanism, Fig. 6 is an end view thereof, Fig. 7 is an enlarged plan view showing the paster and heater and their location with relation to the former, Fig. 8 is a rear elevation of the former and paster and heater with some of the parts in section, Fig. 9 is an elevation of the printing device with the cover of its inclosing chamber removed, Fig. 10 is a plan view thereof, with parts broken away on the line 11—11 of Fig. 9, Fig. 11 is an enlarged view showing the ink transferring roller, Fig. 12 is a sectional view taken on the line 12—12 of Fig. 2, Fig. 13 is a sectional view showing a part of the inking device, Fig. 14 is an elevation of a portion of the picker and grate, Fig. 15 is an end elevation of the picker, Fig. 16 is a front elevation of the adjustable pulley for adjusting the tape belt which carries the rod through the former during its formation, Fig. 17 is a cross section of the same taken on the line 17—17 of Fig. 16, Figs. 18 and 19 are a plan and end view respectively of the scraper which takes the tobacco from the picker, Figs. 20 and 21 are an elevation and plan view of one of the picker blades, Figs. 22, 23 and 24 are an elevation, end view and elevation respectively of the spacing members for spacing the blades of the picker, the latter being of the end one, Fig. 25 is a plan view of a portion of the former, Fig. 26 is a cross section showing the cigarette rod as the heater acts on the seam, Fig. 27 is a cross section taken on the line 27—27 of Fig. 25, Fig. 28 is a similar view taken on the line 28—28 of Fig. 25, Fig. 29 is a side elevation of that portion of the former which turns over the pasted edge, Fig. 30 is an end view showing the filling device, Fig. 31 is a similar view enlarged, illustrating the action of the cut off apron, Fig. 32 is a section showing the bearing for the shaft of the heating wheel, Fig. 33 is a section showing the formation of a cigarette rod in our improved former, and Fig. 34 is a cross section taken on the line 34—34 of Fig 2.

In the construction of a cigarette machine it is customary to provide a frame such as is numbered 1 in the accompanying drawings, which is supported upon suitable standards and has such brackets and other supporting members as are necessary to retain the working parts of the machine in suitable relationship to each other, and it is understood that any frame which will suffice to support the parts of our improved machine may be employed and a detailed description of the same is unnecessary. Mounted upon the frame is a main drive shaft 2, to which suitable power such as a motor is applied and from this shaft all the power necessary to run the different elements of the machine is distributed, and for the purpose of distributing indirectly the power to certain parts, while other parts receive their power directly from the main shaft, we have provided a supplemental driving shaft 3, which furnishes power for the printing dies or rollers and the cutting knife at the opposite end of the machine, this shaft itself receiving its power from the main shaft through the gears 4, 5, and 6 which latter especially presents novel feautres in this case. The gear 5 swings on a movable bracket 7, the latter being released by loosening the nut 8, so that the gear 5 may be swung free of the gear 6, when the latter may be removed and a larger or smaller one substituted therefor to either increase or decrease the rate of speed of the shaft 3 for the purpose of adjusting the machine for cigarettes of different length. As will be seen in the subsequent description the mere change in the size of the gear 5 will alter parts of the machine, such as the printing device and the cutting knife, necessary for the change from one size cigarette to another, and the change only affects such parts as need be changed, leaving the others intact.

In the further description of our machine we will describe the various parts in the order of their action in the making of the cigarette, beginning with the printing device and then passing to the tobacco feeding and other devices.

The device for sizing and printing suitable marks or symbols on the paper web before it is made up into a rod is better understood from Figs. 1, 2, 9, 10, and 11. The power transmitted from the main drive shaft 2, to the supplemental shaft 3 is transmitted to a shaft 9 which directly operates the printing dies, by the miter gears 10, 11, 12 and 13. From the shaft 9 the gears 16 and 17, the gears 15 and 18, gears 13 and 14 transmit the power to the shafts 19, 20 and 21 on which the dies or printing rollers 22, 23 and 24 are mounted. As the paper passes from the reel 25 it first passes around a roller 26 immediately above the die 22 and by swinging the handle 27 on the exterior of the casing the roller 26 is brought close to the printing portion of the die 22 so that the die will press the paper as it passes around the roller 26 and place on the paper the necessary material, and in this case we may assume that this die places a suitable size to receive gold form another die. From there the paper passes the roller 28 which is placed into position by a handle 29, similar to the first one, so that the wiping die 23 will apply the gold to the paper at the point where the previous die placed the sizing. After passing a wiping brush 32 the paper passes into the next compartment of the printing device and engages with a roller 30 which is arranged similar to the rollers 26 and 28 and is controlled by a similar handle 31. While passing the roller 30 the die 24 places any other matter on the paper which might be printed matter in ink. It will be observed that each of the dies receives their action directly from the shaft 9 through similar connections and all operate sychronously. When the speed of the shaft 3 is changed by the substitution of a different sized gear for the gear 5 the speed of the shaft 9 will be likewise changed and the several dies will each be changed in speed the same amount so that the printing will take place on the paper at intervals of different extent and the several dies will always register with each other. That is to say the only change necessary to alter the entire printing apparatus for a larger or smaller length of cigarette is to replace the gear 5 with a larger or smaller gear and change the dies to larger or smaller ones. Heretofore such a change has been difficult and much annoyance has been had in keeping the several dies in registering relationship with each other and with the cutting device.

It will be apparent that whenever the printing device is altered to provide for a change in the length of the cigarettes the cutting knife will not only have to be altered to cut the cigarettes in different lengths but the change will have to correspond exactly with the dies or irregularities in the cigarettes will result. It is for that reason that the cutting knife is operated by the same shaft 3 that operates the printing device and the change in the gear 5 causes a change in the operation of the cutting knife corresponding to the change in the printing.

The remainder of the printing device needs no alteration when the change is made from one cigarette length to another and so the elements are operated by a shaft 33 which is geared to the shaft 2 by means of meshing gears 34 and 35. From this shaft 33 power is distributed through gears 36 and 37 to the shaft 41; and through gears 38 and 39 to shaft 40. The shaft 42 which corresponds to the shafts 40 and 41 is driven from the shaft 20 by the gears 43 and 44. The remainder of our printing device relates to a supply of size to the sizing die; the application of the gold to the die for applying gold and the application of ink to the printing die. In the first chamber of the printing device we have provided a size pot 45 from which the size is taken on the roller 46 and from the latter it is taken on the roller 47 which is rocked from contact with the roller 50 by a bell-crank lever 48 which has a bowl engaging with the cam surface 49. The roller 50 has an internal spring 52 see Fig. 13 which forces the roller outward and a stationary pin 51 on a bracket engages against the cam surface 53 on the outer end of the roller 50 and forces the roller to move laterally on its axle. From the roller 50 the size is carried to the die 22 by another roller 54. In the second compartment of the printing chamber there is a belt 55 which passes around the two rollers 56 and 57 and the belt comes into contact with the wiping tongue of the die 23, to provide gold powder for the paper from the bottom of the compartment, and the friction of the wiping tongue of the die acting on the belt causes the latter to travel sufficiently to feed the gold powder. In this way the gold feeding belt need not move continuously and there is less liability of the gold being agitated. The third compartment is provided with an arrangement for applying ink to the die 24 which is similar to the means for supplying size to the roller or die 22.

When the paper leaves the printing mechanism it passes to the feeding device where the tobacco is dropped from the hopper onto the traveling paper web and we will now describe the construction of the tobacco feeding mechanism. Mounted on the main frame of the machine are two parallel plates 58 and 59 which are mounted on suitable standards and between these two plates there is a traveling blanket or belt 60 which travels around the two rollers 61 and 62 which are arranged between the two plates 58 and 59 at different ends thereof. The blanket is usually inclined upwardly as shown and the tobacco is spread evenly on the blanket by the operator while it travels in the direction indicated by the arrow in Fig. 4 and the tobacco is dropped from the blanket in the manner which will appear. In order to properly carry the tobacco over the upper end of this blanket and feed it to the hopper without forcing it back on the blanket as was the case in prior devices, we have provided another and preferably shorter blanket or belt which is so mounted with relation to the first belt that the two converge toward the point where the tobacco falls over the top of the larger blanket. We have so arranged the shorter belt that its lower surface, which is the one which contacts with the tobacco on the under belt, will travel in the same direction and at the same speed as the upper side of the lower belt or blanket. The upper belt is lettered 63 in the drawings and it travels over the two rollers 64 and 65 which are mounted between the plates 58 and 59 the same as the rollers of the larger belt. The shaft of the roller 65 is provided with a sprocket 67 over which there travels a chain 66 which is driven from the sprocket 68 on the shaft 69, the latter receiving its power as will appear hereinafter. The power for the larger rollers 62 and 63 is transferred from the roller of the small belt by means of the gears 70, 71, 72, and 73 which mesh with each other, and transfer the power from the roller 65 to the roller 62 of the larger belt, thus causing both belts to move at the same speed. As the belts are liable to become slack from use we have provided movable journals 74 for the roller of the larger belt and a similar journal 75 for the roller of the smaller belt whereby the belts may be tightened. As the tobacco passes from the feed belt it is engaged by a picker which picks and separates the tobacco and this forms a novel feature of our invention. Heretofore a revolving roller has been provided with a series of pins for picking the tobacco as it comes from the belt and such device has been defective because of the tendency of the small pins to break in use and because there was no provision made for any change where the size of the cigarette is made larger or smaller, or the weight changed.

Our invention contemplates a picker which will be very strong and in which parts may be removed and replaced when they become broken; and the device is so adjusted that when cigarettes of larger diameter or greater weight, requiring a greater amount of tobacco to the linear dimensions, are being made the picking blades will extend beyond the grating a greater distance than when the thinner or lighter cigarettes are being made. The device is shown more clearly in Figs. 4, 18 and 19. Upon a shaft 81, which is mounted between the plates 58 and 59, near the roller 62, there is provided a roller 76 on which there is placed alternately a toothed wheel 77 and a spacing ring 78, the toothed wheels extending about the width of the belt 60. The end rings 79 are threaded inside and are screwed upon the ends of the roller 76 to hold the parts together.

It will be seen that by so constructing the picker teeth are very substantial and less likely to break than the small pins heretofore used, and if any of the parts are broken they may be removed and replaced. We have arranged a grate with bars which lie between the several toothed wheels of the picker and which is adjustable in relation thereto, so that the teeth of the picker may be made to extend a greater or lesser extent beyond the grate bars. As shown this grate consists of a bar 82 which may be swung on pins at each end and fastened in any position, and extending downwardly from this bar are grate bars 83 which are preferably curved and they lie between the several toothed wheels 77 of the picker. By swinging the grate the bars 83 will lie near the ends of the teeth 80 or near their base as desired according to the quantity of tobacco to be fed, which depends as stated, upon the weight of the cigarettes being made. Below the picker there is arranged a scraping grate consisting of a bar 84 having bars 85 extending upwardly therefrom, and between the teeth 80 and these bars scrape off any tobacco which may cling to the teeth.

As the tobacco drops off the belt 60 it is picked and it then drops to another belt 86 below. This latter belt moves in a reverse direction to the upper feed belt and carries the tobacco to another picker, and the speed of the belt 86 is preferably greater than the speed of the belt 60. The belt 86 takes the tobacco which has fallen from the first picker to another picker located at the end of the belt 86, and this picker is in all respects like the one just described except that the grate bars 83 are preferably omitted. From the last picker the tobacco drops down the hopper onto the traveling paper web 90 below. For operating the belt 86 we have provided a worm gear 91 which meshes with a gear 92 on the shaft 69 on which the roller 88 is mounted on the worm 91 is operated by a chain 93 which travels over the sprocket 94 and is operated from the sprocket 95, the connection of which will be described later. In order to operate the pickers and some of the belts described we have provided a chain 96, (see Fig. 3) which is operated from the sprocket 97 on the main shaft of the machine. This chain passes around an idler 98 and from there to the sprocket 99 which is mounted on the shaft of the first picker; from there it goes around an idler 100 and then around another sprocket 101 which is mounted on the shaft of the second picker. We are thus enabled to run the several parts from a common source and at the same speed and in their proper directions.

Near each end of the hopper there are mounted pulleys over which there travels a belt for propelling the paper web through a portion of the machine and under the hopper where the paper receives the tobacco.

The pulley 102 is mounted ahead of the hopper and the pulley 103 is mounted after it and over them travels a belt 104 on which the paper web rests and by which it is propelled while traveling under the hopper. The rear pulley 103 is provided with a sprocket 105 which is driven by a chain 106 running over sprocket 107 on another pulley. The shaft of the pulley 103 is provided on one end with a gear 108 which meshes with a gear 109, running on shaft 110 and on one end of the latter there is provided a roller 111 which is mounted above the pulley 102 and compresses the tobacco on the paper as it leaves the hopper. After the paper, with the tobacco distributed on the top of it leaves the hopper and compression roller it passes through the former which forms the same into a rod ready for pasting.

The former which we have used is similar in many respects to the ordinary former. There is a tape belt 117, shown dotted in Fig. 8 which travels over the pulley 112 and over a small idler 113, over a plate 114, on which the hood 115 of the former is mounted and then through the former proper, in the usual way. Heretofore the bottom chamber of the former has been made straight and has been placed on the line of travel of the tape belt which carries the paper through the former. In other words the top line of the pulley and idler and the bottom of the forming chamber have been on a common plane. The result is that as the curves of the former bend over the edges of the paper web to form the cigarette rod and with it the tape belt, the edges of the tape belt are raised up from the plane of travel of the belt and greater stress is placed on the outer edges of the belt and paper owing to such distortion. This causes the belt to wear out quickly and affects the proper and even formation of the rod in the former. It often separates the seam of the rod. To cause an even pressure throughout the whole width of the belt and likewise the paper and rod, we contemplate making the former so that the middle portion of the belt is depressed below the plane of travel of the belt, while the outer edges are raised, and in order to have the pressure throughout the belt even we have depressed a part of the cigarette former half the thickness of a cigarette. As shown in Fig. 8 the cigarette former is curved downwardly, preferably between the points X—X of Fig. 8, so that while the paper web and belt are passing through the former and the outer edges are being turned up, the middle portion is being slightly depressed to distribute the pressure on the belt. This action is clearly shown in Fig. 33.

Z—Z represents the plane of the belt in an ordinary machine such as is now in use and this plane remains the same throughout the former. To bend the outer edges 116 of the belt 117 up from the plane Z—Z puts a greater stress on the edges of the belt. Whereas in our folder the line Y—Y represents the normal plane of the belt and the line Z—Z represents the bottom line of the former where it is depressed, such as between the points X—X of Fig. 8. It will be seen that when the outer edges 116 of the belt are being raised from the line Y—Y the middle of the belt is also being depressed to the line Z—Z so that the stress is equalized.

The part 118 of the former is open at the top 119 for the paste wheel to operate on the edges of the paper and a lip 120 turns the pasted edge over to overlap the other edge and the heating roller irons and dries the seam as it passes from the lip 120.

The pulley 112 is shown clearly in Figs. 16 and 17 and is novel in construction. A plurality of segments 121, preferably four, are provided with peripheral flanges 122, which acting together form a pulley and these segments are bolted to a rim 123 by means of bolts 124 which have rollers 125 thereon. Elongated slots 126 are provided in the several segments for the bolts 124. There is also provided a cam member 127 which has cam surfaces 128, eccentric to the shaft 129 which act upon the rollers 125 and when the bolts 124 have been loosened and also screws 130 which pass through elongated slots 131 to hold the cam member to the rim 123, by turning the segments in relation to the rim and cam member, the cam faces 128 will force the segments out from the center, thus enlarging the periphery of the whole. When it is found that the pulley is worn, or whenever it is necessary to adjust it to cause the belt to travel at a slightly different speed the adjustment may be made as just described, and the machine be made to run accurately. In order to prevent the belt from slipping on the periphery of the pulley, we provide tapes or coverings 131ª which pass over the periphery of the segments and come together underneath; each segment having its separate tape, so as not to interfere with the pulley adjustment above described. In order to tighten the several tapes we have provided arms 132 on the several segments which rock from the bolt 133 and by which they are adjusted so that their pins 135 press upward on the tape and keep them tight.

The pasting and heating rollers are swung on a common bracket and are operated from the main shaft of the machine.

The shaft 136 carries an arm 137 on which the heater and paster are carried. The arm 137 carries a paste pot 138 which supplies the paste for the cigarette rod. Secured to the paste pot are brackets 139 and 140 in which a shaft 141 carrying a paste wheel 142 is journaled. The paste wheel is so positioned by the bracket that when swung into position its periphery will supply paste to the cigarette rod as shown in Fig. 12, just before the seam is overlapped. There is journaled to the shaft 141 another bracket 143 in the free end of which there is journaled another shaft or spindle 144, which latter carries a heating roller 145. The roller 145 is so carried by the bracket that it may be swung so that its under side or face will be pressed on the seam of the cigarette rod after it comes from the paster and while acting on the rod it not only is under heat but is also rapidly revolved, so as to heat and iron the seam of the rod, without affecting the shape of the rod. The heating roller may be heated by gas, or electricity as desired, Fig. 8 showing the roller provided with an upper heating chamber which is heated by electricity.

The shaft 136 is provided with a gear 146 which meshes with the gear 147 on the main shaft. From the shaft 136 the paste wheel is driven by means of a belt 148 which travels on a pulley 149 on shaft 136 and on a pulley 150 on shaft 141. The power for driving the heater wheel is transferred from the shaft 141 to the shaft or spindle 144 by the belt 151 which travels on pulleys 152 and 153.

As the heat from the roller will be transmitted somewhat down its shaft, it would be difficult to keep an open or ordinary journal oiled, and the heat would cause the bearing to dry. For that reason we have provided a novel bearing for the shaft or spindle 144. Instead of having a journal open through the bracket 143 we have simply formed a journal socket in which the spindle is seated and in which it revolves. Between the contact points of the spindle and its bearing we have formed a chamber 154 for retaining the necessary oil for the spindle. No matter how much the oil may be heated it can not run off the journal, leaving it dry, and there is no danger of the oil getting on the cigarette rod.

As will be seen in Fig. 1 there is a second pulley 155 on the shaft 136 and on this pulley and on the pulley 157 runs a belt 156. Through this connection the worm 158 is made to run a paste roller 159 through its engagement with the gear 160 thereon. The roller 159 communicates the paste from the paste pot 138 to the paste wheel 142, as shown in Fig. 12. It will be obvious that the paste and heating wheels may be swung on their supporting bracket to move them into or out of action on the cigarette rod.

It might be here noted that the pulley 112 is driven by the main shaft through gear 160 on the latter meshing with gear 161 on the shaft of the pulley 112.

When the cigarette rod leaves the heater it travels to the knife to be cut into lengths for use and we will here describe the knife and its operation. The cutting knife receives its operating force from the shaft 3. We have provided a long arm 162 which is preferably fulcrumed to a very low support such as the floor plate 163, so as to move in an arc parallel with the length of the machine and on this arm is carried the knife and its working parts. On the upper portion of the arm 162 we have provided a rocking arm 164 which fulcrums on a shaft 165, carried in a journal, and from this same member extends another arm 166. On the free end of the arm 164 we have provided a shaft 167 which carries on one end a revoluble knife 168 disposed at right angles to the path of the cigarette rod and on its other end a pulley 169 by which the knife is operated. The shaft 165 is provided with a double pulley 170 and over one part of it a belt 171 travels and communicates the power to pulley 169 to run the knife. To communicate the power to pulley 170 we provide a belt 172 which travels over it and over a pulley 173 on shaft 174. It will thus be seen that the power is distributed from the point where the arm 164 fulcrums, to the knife so that there is no interference with the rocking of the knife arm. The arm 166 has a downwardly extending plate 175 which is connected by a screw 176 which enters the elongated slot 177 and by this connection the plate 175 may be adjusted vertically. The lower part of this plate is provided with a roller 178 which is in contact with the periphery of cam 179 and by which the arm 166 and knife carrying arm 164 are rocked, the roller 178 being long enough to engage the cam 179 during the rocking of arm 162. This cam 179 is so curved that its sides will operate (see Fig. 1ª) on rollers 180 which are provided on the arm 162, on opposite sides of the cam 179. The upper part of the arm 162 is also provided with circular guides 181 through which the cigarette rod passes as it comes from the heater and between these guides the knife operates to cut the rod as shown in Fig. 1ª. The plate 182 which forms the upper portion of the arm 162 is adjustably secured to the latter by a bolt and slot connection 183 so that it may be raised or lowered thereon and with it the knife. The cam 179 it is to be noted is revolved with the shaft 3.

The power for driving shaft 174 is derived from shaft 3 by means of a belt 183 which travels on the pulleys 184 and 185. The operation of the knife is as follows:

The cigarette rod travels from the heater to the guide 181. The arm 164, carrying the revolving knife is continuously rocked up and down by the action of the cam 179 on the roller and as it does so the knife cuts through the rod and severs a length sufficient for a cigarette, at each operation, the cut corresponding each time with the printing on the rod. As the rod travels continuously, the knife during the cutting must travel with the rod and this action is provided for by the cam 179 operating on rollers 180 to rock the arm 162. As the arm 162 may be oiled on its fulcrum near the floor there is less liability of oil getting on the rod than in former devices and the long swing of the arm reduces friction over the slide movement and makes the parts more accurate. When the knife becomes worn so that its diameter is reduced, adjustment is made by lowering the plate 182 and adjusting the plate 175 in relation to the cam.

Heretofore it has been customary to drop the cigarettes from the knife into a temporary receptacle from which they are removed by hand and we have provided means for placing them in receptacles which may be removed. The device for this purpose is more clearly shown in Figs. 1ª, 2ª, and 30. A conveyer 185 is provided at the end of the machine which is driven from shaft 174 by a belt 186 which travels over pulleys 187 and 188. Boxes 189 are placed on the conveyer, end to end, and they are conveyed under a filling hopper. We have provided a chute 190 which catches the cigarettes as they are severed by the knife. From this chute they pass down onto a traveling belt 191. The belt 191 is operated from shaft 174 by a belt 192 which travels over pulleys 193 and 194. As the cigarettes pass along on the belt 191 they are deposited on an inclined grating 195, through which dust and tobacco pass, and the cigarettes drop into a retaining receptacle or hopper 196. This hopper has an opening 197 in its bottom over the path of the boxes 189 and near the opening is a flexible apron 198. If a box 189 is under the opening 197 the cigarettes run down on the apron into the box where they pile, and the speed of travel of the boxes on the conveyer is such that the boxes about fill during the time required to pass the opening 197. When the adjoining ends 199 of the boxes approach the opening 197 they raise the flexible apron and cut off the flow of cigarettes until the box ends are sufficiently away from the opening, when the weight of the cigarettes will drop the apron into the next succeeding box. This automatic filling goes on continuously, the boxes being placed on one end of the conveyer and taken off filled from the other.

The operation of the machine has been set forth in the preceding description and may be readily understood therefrom. The paper is drawn from the reel by the tape belts and it first passes under rollers 26, 28 and 30, during which time size, gold and ink are applied by the several dies. It is an important feature of the present arrangement of the printing dies that it requires less force to draw the paper through the printer and there is less stress thereon which reduces liability of breakage and non-registering of the knife with the printing device. From there the paper travels under the hopper where tobacco, which is fed by the traveling blankets and pickers, drops on the paper. It then passes under the pressure roller and into the former. It now is propelled by the second tape belt and as the paper and tape belt pass through the former the rod is formed, with one edge of the paper raised to be acted upon by the paste roller. As soon as this edge passes the paste wheel the lip 120 presses it over the opposite edge and the seam passes under the heater, whose heated face rapidly revolves against it, drying the seam and without any interference with the shape of the rod. From there the rod passes into the guide 181 where it is cut into lengths. As soon as the cigarettes are cut they drop into the chute, pass on the belt to the hopper, and finally into the moving boxes.

An important feature of our machine, is the arrangement of the printing and cutting devices, with their common operating means and the common adjusting means. Heretofore difficulty has been experienced in getting both of these devices in harmony. In our machine simply the speed of the dies is changed and as they operate from a common source and synchronously they are all changed simultaneously and equally. Furthermore, when such a change in former machines has been made there has been difficulty in changing the speed of the knife operator so that the knife would be in exact accord with the printer, and with the change corresponding to the change of length of cigarettes desired. As the knife and printer are at different ends of the machine and as such machines must be adjusted to thousandths of an inch adjustment has been difficult and uncertain. In our machines the gear 5 is replaced by another of different size and both the printing and cutting devices are simultaneously changed and equally as to each other so that each registers with the other.

While we have described in detail one embodiment of our invention we do not wish to be limited thereto as other forms and arrangements may be used without departing from the spirit of our invention and the scope of the claims.

Having described our invention what we claim is:

1. A cigarette machine having a printing device comprising means for applying size or the like to the cigarette paper and means for applying powder to the said paper comprising a continually revolved member having a wiper for applying the powder intermittently to the paper and a movable belt adapted to feed the powder to the applying means, said belt being adapted to be operated by the intermittent contact of the wiping element of the powder applying means therewith as it takes off the powder for the paper.

2. A cigarette machine comprising a main shaft and a supplemental shaft operated thereby, cigarette printing means comprising a plurality of dies adapted to be operated by the supplemental shaft, cigarette cutting means also operated from the said supplemental shaft, means for altering the speed of the supplemental shaft to simultaneously change the dies and the cutting device and means for applying printing material to the said dies, operated by said supplemental shaft directly.

3. A cigarette machine containing a belt for conveying tobacco and a picking device for picking the tobacco as it comes from the belt, comprising a revoluble picker having picker blades, a grate having downwardly extending bars between the picker blades and another grate having upwardly extending bars between the picker blades, the said grates being adapted to be rocked to alter the positions of their bars with relation to the teeth of the picker blades.

4. A cigarette machine having a former, provided with a chamber for the formation and passage therethrough of a cigarette rod, said former being formed so that the said chamber inclines downwardly and then upwardly, forming a depression therein, in that portion wherein the cigarette rod is formed.

5. A cigarette machine containing a former having a chamber in which the cigarette paper is adapted to be folded to form a cigarette rod, said former being formed so that the said chamber inclines gradually downwardly, beginning substantially at the point where the paper begins to be folded and so that the said chamber gradually inclines upwardly following its downward incline.

6. In a cigarette machine a former, having a chamber for the formation of a cigarette rod, said former being formed so that the said chamber inclines downwardly and then upwardly, to form a depression therein, the extent of depression being equal to one half of the thickness of the cigarette rod formed in said chamber.

7. A cigarette machine having a plurality of belt carrying members and a belt thereon and a former having a chamber in which a cigarette rod is adapted to be formed and through which chamber said belt is adapted to propel the cigarette paper, the said chamber being formed so that the said chamber inclines downwardly and then upwardly, forming a depression, said depression extending below the normal plane of said belt, whereby said belt will be depressed while passing through said chamber.

8. A cigarette machine having an operating shaft operating various mechanisms of the machine, a former for forming a cigarette rod, a propelling belt traveling through the former and adapted to propel the cigarette rod therethrough, a driving pulley propelled from said shaft, over which pulley the said belt engages, the pulley being adjustable, whereby its periphery may be increased or decreased to alter the speed of the said belt to alter the speed of the cigarette rod.

9. A cigarette machine having an operating shaft operating various mechanisms of the machine, a former for forming a cigarette rod, a propelling belt traveling through the former and adapted to propel the cigarette rod therethrough, a driving pulley propelled from said shaft, over which the said belt travels, the said pulley having a plurality of adjustable segments whereby its periphery may be increased or decreased to alter the speed of the said belt to change the speed of travel of the cigarette rod.

10. A cigarette machine having an operating shaft operating various mechanisms of the machine, a former for forming a cigarette rod, a propelling belt traveling through the former and adapted to propel the cigarette rod therethrough, and a driving pulley propelled from said shaft, over which the said belt travels, the said pulley comprising a plurality of adjustable segments and a cam member adapted to simultaneously move the several segments away from the center, to increase the periphery of the pulley to adjust the speed of the belt to change the speed of the cigarette rod.

11. A cigarette machine having a belt for propelling a cigarette rod and a pulley for said belt comprising a plurality of segments adapted to be adjusted to alter the periphery of said pulley, said segments having separate continuous bands extending over their peripheries and adapted to prevent slipping of the said belt on the pulley.

12. A cigarette machine having a belt for propelling a cigarette rod and a pulley for said belt comprising a plurality of adjustable segments for altering the circumference of said pulley, said segments having flanges forming the periphery of said pulley and independent bands extending around said flanges and means for tightening said bands, the said bands being adapted to prevent the slipping of the belt on the pulley.

13. A cigarette machine having means for forming a cigarette rod and means for heating the seam of the rod, comprising a revoluble roller having a flat face, the roller engaging with its face against the pasted seam of the cigarette rod and means for heating said roller.

14. A cigarette machine having means for forming a cigarette rod, a roller adapted to engage the seam of the rod, means for heating said roller, a vertically disposed revoluble shaft on which the said roller is mounted and a support for said shaft in which the said shaft is journaled in a closed journal socket.

15. A cigarette machine having means for forming a cigarette rod, a roller adapted to engage on its face with the seam of the cigarette rod, means for heating said roller, a vertical shaft carrying the said roller, a support in which said shaft sets in a socket, closed at its lower end, said support having an oil chamber therein and means for revolving said shaft.

16. A cigarette machine having means for forming a cigarette rod and cutting the same, means forming a receptacle for receiving the cigarettes discharged from the cigarette machine and having an aperture therein for the discharge of cigarettes therefrom, a flexible apron lying near the aperture and adapted to shut off the flow of cigarettes therefrom and a conveyer adapted to convey receptacles below said discharge aperture so that they will contact with said apron.

17. A cigarette machine having means for forming a cigarette rod and means for cutting the rod into cigarettes, comprising an arm pivoted at its lower end to a support to permit its upper end to swing in a plane parallel with the travel of the cigarette rod, and a second arm pivoted to the upper end of the first arm to swing in a plane transverse to the axis of the cigarette rod, a cutting knife carried by the said second arm, and means for revolving the knife to cut the cigarette rod and means for rocking the said arms, whereby the knife will be caused to sever the cigarette rod, while traveling in the direction of movement of the rod.

18. A cigarette machine having means for forming a cigarette rod and means for cutting the rod into cigarettes, comprising an arm pivoted at its lower end to a support to permit its upper end to swing in a plane parallel with the travel of the cigarette rod, and a second arm pivoted to the upper end of the first arm to swing in a plane transverse to the axis of the cigarette rod, a revoluble cutting knife carried by the said second arm and a revoluble cam, the said first arm engaging the face of the cam to cause the rocking of the arm and said second arm engaging the periphery thereof to cause the rocking of the arm whereby the knife will be caused to sever the cigarette rod while traveling therewith.

Signed at the city, county and State of New York, this 3rd day of June, 1908.

JULIUS C. DRUCKLIEB.
CASPAR SIMON.

Witnesses:
SHELDON A. DU COT,
EDWARD D. C. SPERRY.